United States Patent
Mori et al.

(10) Patent No.: US 11,612,156 B2
(45) Date of Patent: Mar. 28, 2023

(54) TORQUE LIMITING DEVICE FOR A FISHING REEL

(71) Applicant: Shimano Inc., Osaka (JP)

(72) Inventors: Seishu Mori, Osaka (JP); Hitoshi Haraguchi, Osaka (JP)

(73) Assignee: Shimano Inc., Osaka (JP)

(*) Notice: Subject to any disclaimer, the term of this patent is extended or adjusted under 35 U.S.C. 154(b) by 0 days.

(21) Appl. No.: 17/491,917

(22) Filed: Oct. 1, 2021

(65) Prior Publication Data
US 2022/0125027 A1    Apr. 28, 2022

(30) Foreign Application Priority Data
Oct. 22, 2020   (JP) .............................. JP2020-177450

(51) Int. Cl.
*A01K 89/01*   (2006.01)
*A01K 89/033*  (2006.01)

(52) U.S. Cl.
CPC .................................. *A01K 89/053* (2015.05)

(58) Field of Classification Search
CPC .............. A01K 89/053; A01K 89/0186; A01K 89/01915; A01K 89/01916
See application file for complete search history.

(56) References Cited

U.S. PATENT DOCUMENTS

| 2016/0219853 A1* | 8/2016 | Takechi | A01K 89/0183 |
| 2019/0327948 A1* | 10/2019 | Chan | A01K 89/0186 |

FOREIGN PATENT DOCUMENTS

| JP | 5912371 B2 | 4/2016 | |
| JP | 2019129781 A * | 8/2019 | A01K 89/006 |

* cited by examiner

*Primary Examiner* — Emmanuel M Marcelo
(74) *Attorney, Agent, or Firm* — Global IP Counselors, LLP

(57) ABSTRACT

A torque limiting device for a fishing reel for limiting torque between first and second rotating members, the torque limiting device includes an engagement recess, an engagement member and a biasing member. The engagement recess is disposed on an inner circumferential surface of the second rotating member. The engagement member has a head portion that engages the engagement recess and is disposed on the first rotating member so as to be capable of advancing toward or retreating from the second rotating member. The biasing member biases the engagement member toward the second rotating member. The head portion of the engagement member has a straight part at a distal end that extends linearly in a direction of the axis of rotation of the first rotating member.

4 Claims, 7 Drawing Sheets

TORQUE LIMITING DEVICE FOR A FISHING REEL

CROSS-REFERENCE TO RELATED APPLICATIONS

This application claims priority to Japanese Patent Application No. 2020-177450, filed on Oct. 22, 2020. The entire disclosure of Japanese Patent Application No. 2020-177450 is hereby incorporated herein by reference.

BACKGROUND

Field of the Invention

The present invention relates to a torque limiting device for a fishing reel and a fishing reel.

Background Art

Some conventional fishing reels are equipped with a torque limiting device. For example, the torque limiting device disclosed in Japanese Patent No. 5912371 limits the torque between a handle shaft and a gear that is supported by the handle shaft. The torque limiting device comprises an engagement member and a biasing member. The distal end of the engagement member engages the inner circumferential surface of the gear. The biasing member biases the engagement member toward the inner circumferential surface of the gear.

SUMMARY

It has been found that in such a torque limiting device, improved durability is desired. An object of the embodiments of the present invention are to improve the durability of torque limiting devices for fishing reels.

A torque limiting device for a fishing reel according to one embodiment of the present invention limits torque between a first rotating member disposed so as to be rotatable relative to a reel body, and a second rotating member disposed so as to be rotatable about an axis of rotation of the first rotating member on an outer peripheral side of the first rotating member. The torque limiting device comprises an engagement recess, an engagement member, and a biasing member. The engagement recess is formed on an inner circumferential surface of the second rotating member. The engagement member is disposed on the first rotating member so as to be capable of advancing toward and/or retreat from the second rotating member. The engagement member has a head portion that can engage the engagement recess. The biasing member biases the engagement member toward the second rotating member. The head portion of the engagement member has a straight part at the distal end that extends linearly in the direction of the axis of rotation of the first rotating member.

In this embodiment of a torque limiting device for a fishing reel, since the head portion has a straight part at the distal end, the engagement member comes in linear contact with the engagement recess. Since stress is distributed as compared with the case in which the engagement member comes contact with the engagement recess at a point, the durability of the engagement member and the engagement recess is improved. As a result, the durability of the torque limiting device is improved.

At least the head portion of the engagement member can be made of resin. In this embodiment, since the durability of the engagement member and the engagement recess is improved because the engagement member comes in contact with the engagement recess along a line, at least a part of the engagement member can be made of resin, and it is possible to reduce the weight of the torque limiting device.

The head portion can be connected to the straight part, and at least a portion thereof can have a pair of inclined portions that can come into contact with the engagement recess. The pair of inclined portions can be formed so as to extend outwardly in the direction of the axis of rotation of the first rotating member as the one pair approaches the straight part. In this embodiment, it is possible to achieve both a weight reduction and improved durability of the engagement member.

A fishing reel according to another aspect of the present invention comprises a reel body, a first rotating member disposed so as to be rotatable relative to the reel body, a second rotating member disposed so as to be rotatable about an axis of rotation of the first rotating member on an outer peripheral side of the first rotating member, and the above-described torque limiting device that limits the torque between the first rotating member and the second rotating member.

In this embodiment of a fishing reel, since the head portion of the engagement member has a straight part at the distal end, the engagement member comes in contact with the engagement recess along a line. Since stress is distributed as compared with the case in which the engagement member comes in contact with the engagement recess at a point, the durability of the engagement member and the engagement recess is improved. As a result, the durability of the torque limiting device is improved.

By embodiments of the present invention, it is possible to improve the durability of a torque limiting device for a fishing reel.

DETAILED DESCRIPTION OF EMBODIMENTS

Figure 1:
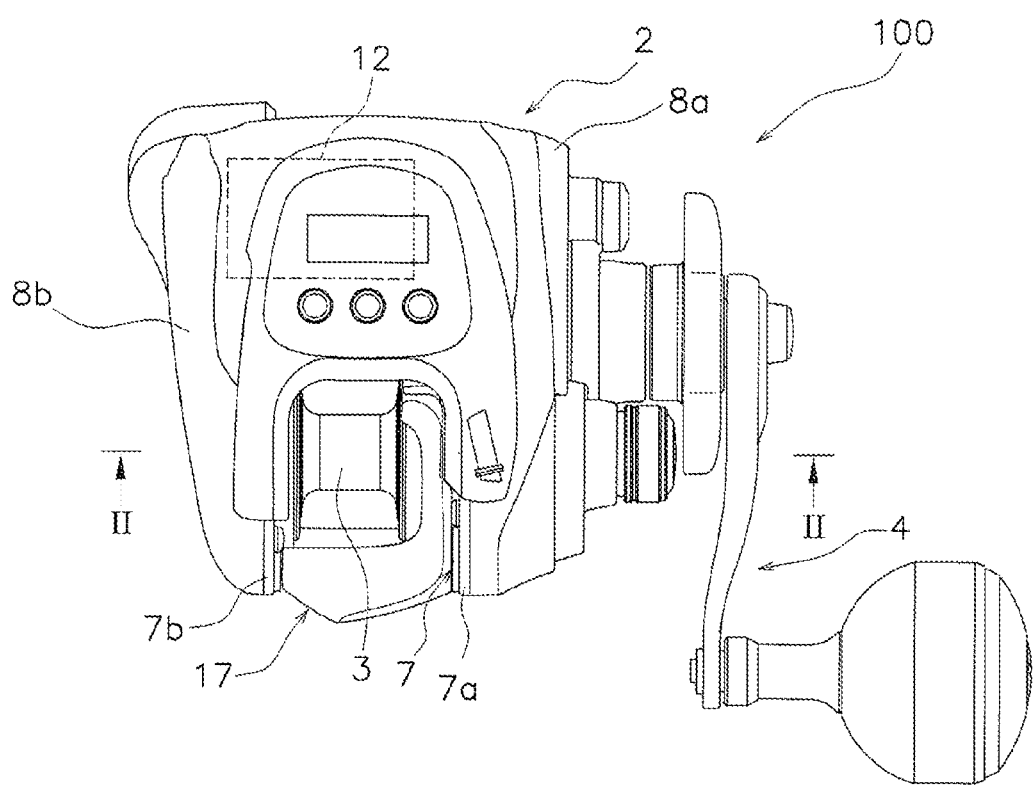
FIG. 1 is a plan view of a fishing reel employing a first embodiment of the present invention.
Figure 2:
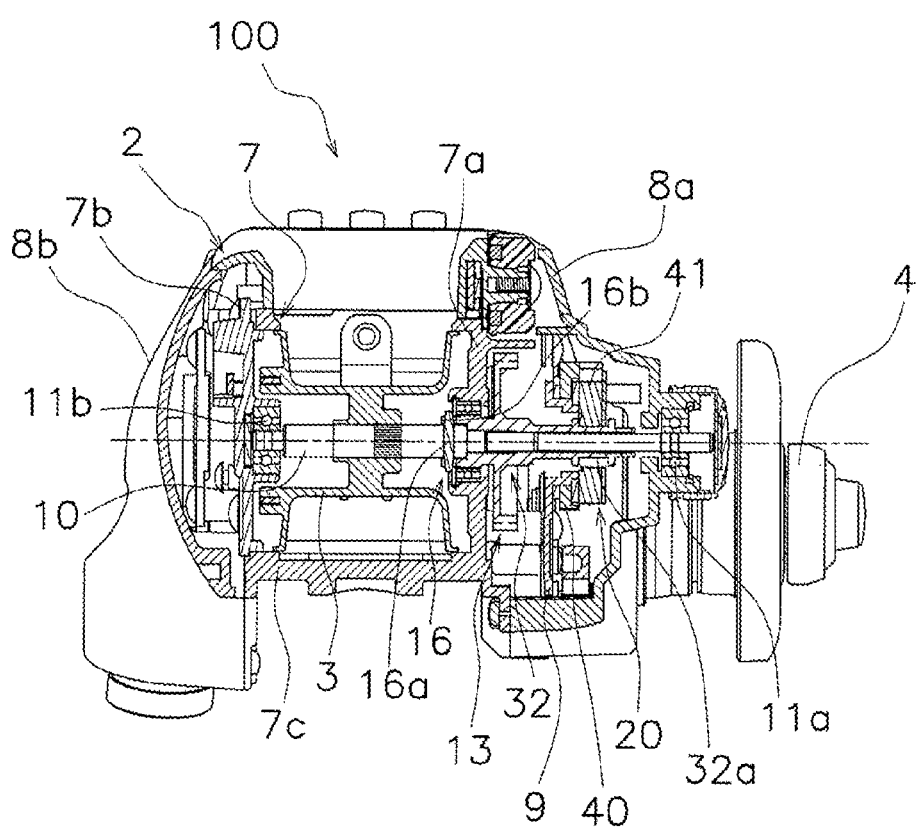
FIG. 2 is a cross section through line II-II in FIG. 1.
Figure 3:
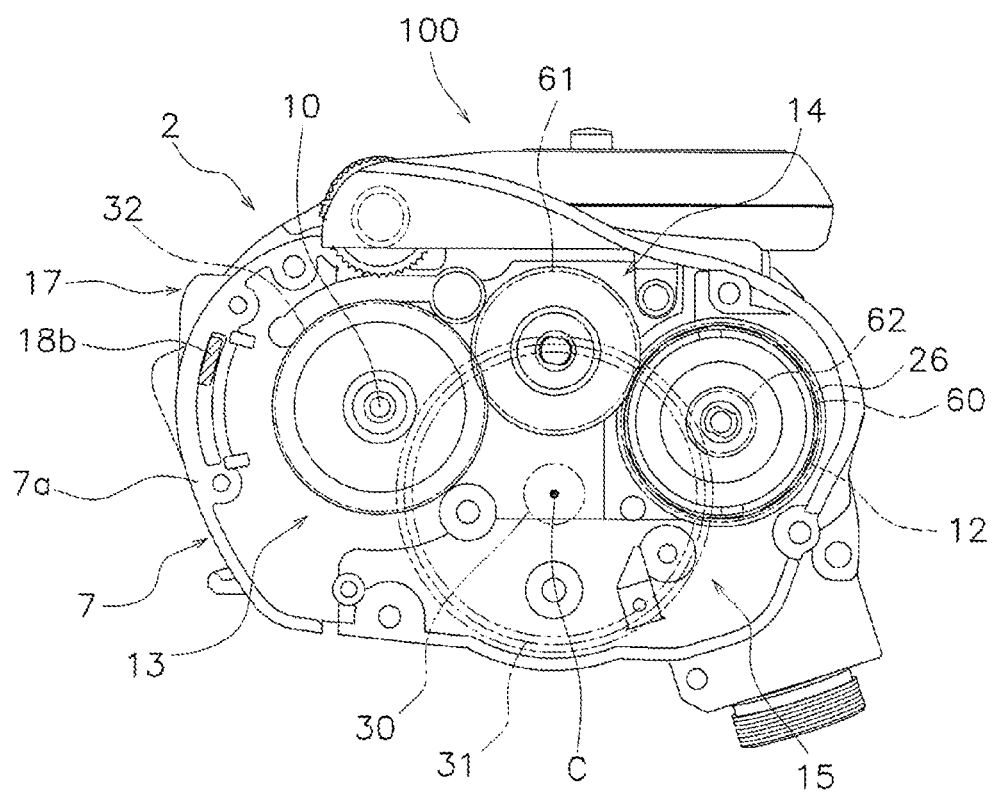
FIG. 3 is a partially exploded perspective view of the fishing reel.

As shown in FIGS. 1 to 3, a fishing reel 100 including a first embodiment of the present invention comprises a reel body 2, a spool 3, a handle 4, and a spool drive mechanism 13 (refer to FIG. 3). The fishing reel 100 is an electric reel in which a motor 12 is driven with electric power supplied from an external power source to rotate a spool 3. In the following description, the direction in which a spool shaft 10 and a drive shaft 30, described further below, extend is referred to as the axial direction. The direction orthogonal to the axial direction is referred to as the radial direction.

The reel body 2 has a frame 7, a first side cover 8a, and a second side cover 8b. The frame 7 has a first side plate 7a, a second side plate 7b, a plurality of connecting portions 7c, and a mechanism mounting plate 9.

The first side plate 7a is disposed on the right side of the frame 7 facing forward (direction in which the fishing line is unwound). The second side plate 7b is disposed on the left side of the frame 7, spaced apart from the first side plate 7a in the axial direction. The plurality of connecting portions 7c extend in the axial direction and connect the first side plate 7a and the second side plate 7b. The mechanism mounting plate 9 is disposed between the first side plate 7a and the first side cover 8a. The mechanism mounting plate 9 is disposed between the first side plate 7a and the first side cover 8a, and various mechanisms are mounted on the mechanism mounting plate 9.

The first side cover 8a covers the right side of the first side plate 7a of the frame 7. The second side cover 8b covers the left side of the second side plate 7b of the frame 7.

As shown in FIG. 2, the spool 3 is disposed between the first side plate 7a and the second side plate 7b so as to be rotatable with respect to the reel body 2. The spool 3 is supported by the spool shaft 10 that extends inside the reel body 2 in the axial direction. The spool 3 is mounted on the spool shaft 10 so as to be able to rotate integrally therewith. The spool shaft 10 is rotatably supported on the reel body 2 via a pair of axle bearings 11a, 11b disposed in the reel body 2. The spool shaft 10 in the present embodiment extends in the left-right direction.

The handle 4 is rotatable relative to the reel body 2. The handle 4 is disposed on the first side cover 8a side of the reel body 2.

The spool drive mechanism 13 transmits the rotation of the handle 4 and the motor 12 to the spool 3. As shown in FIG. 3, the spool drive mechanism 13 has a first rotation transmission mechanism 14 and a second rotation transmission mechanism 15.

The first rotation transmission mechanism 14 decelerates the rotation of the motor 12 and transmits it to the spool 3. Specifically, the first rotation transmission mechanism 14 has a planetary gear mechanism, not shown, connected to an output shaft of the motor 12, a first gear member 60, a second gear member 61, and a pinion gear 32.

The rotation of the motor 12 is transmitted to the first gear member 60 via the planetary gear mechanism. The second gear member 61 meshes with the first gear member 60. The second gear member 61 is an intermediate gear for transmitting the rotation of the first gear member 60 to the pinion gear 32, and meshes with the pinion gear 32.

The pinion gear 32 can rotate about the axis of the spool shaft 10, and the spool shaft 10 penetrates the inner peripheral portion thereof. In addition, the pinion gear 32 is disposed in the reel body 2 so as to be movable in the axial direction between a coupled position, in which the pinion gear is connected to the spool shaft 10 so as to be integrally rotatable therewith, and a decoupled position, in which the connection with the spool shaft 10 is released. The pinion gear 32 engages a clutch yoke 41, described further below, and moves in the axial direction together with the clutch yoke 41. The pinion gear 32 has an annular recess 32a with which the clutch yoke 41 engages.

The second rotation transmission mechanism 15 transmits the rotation of the handle 4 to the spool 3 via the first rotation transmission mechanism 14. The second rotation transmission mechanism 15 has the drive shaft 30 (one example of the first rotating member), a drive gear 31, and a third gear member 62.

The drive shaft 30 is disposed so as to be rotatable relative to the reel body 2. The drive shaft 30 extends in the left-right direction. The axis of rotation C of the drive shaft 30 extends in a direction orthogonal to the plane of FIG. 3. In the following description, the direction in which the axis of rotation C of the drive shaft 30 extends is referred to as the rotational axis direction. In the present embodiment, the rotational axis direction coincides with the axial direction. The handle 4 is connected to the drive shaft 30 so as to be rotatable integrally therewith.

The drive shaft 30 is prohibited from rotating in the direction opposite to the line-winding direction by a roller clutch, not shown, mounted on the first side cover 8a. In addition, the drive shaft 30 is also prohibited from rotating in the direction opposite to the line-winding direction by a pawl-type one-way clutch, composed of a rotating member 52 and a pawl member 54 (refer to FIG. 4) that can engage with the rotating member 52.

The drive gear 31 is attached to the drive shaft 30 so as to be rotatable. The rotation of the drive shaft 30 is transmitted to the drive gear 31 via a known drag mechanism.

The third gear member 62 meshes with the drive gear 31 and is connected to the carrier of the planetary gear mechanism so as to be integrally rotatable therewith. As a result, the rotation of the third gear member 62 is transmitted to the pinion gear 32 via the carrier, the first gear member 60, and the second gear member 61.

Figure 4:
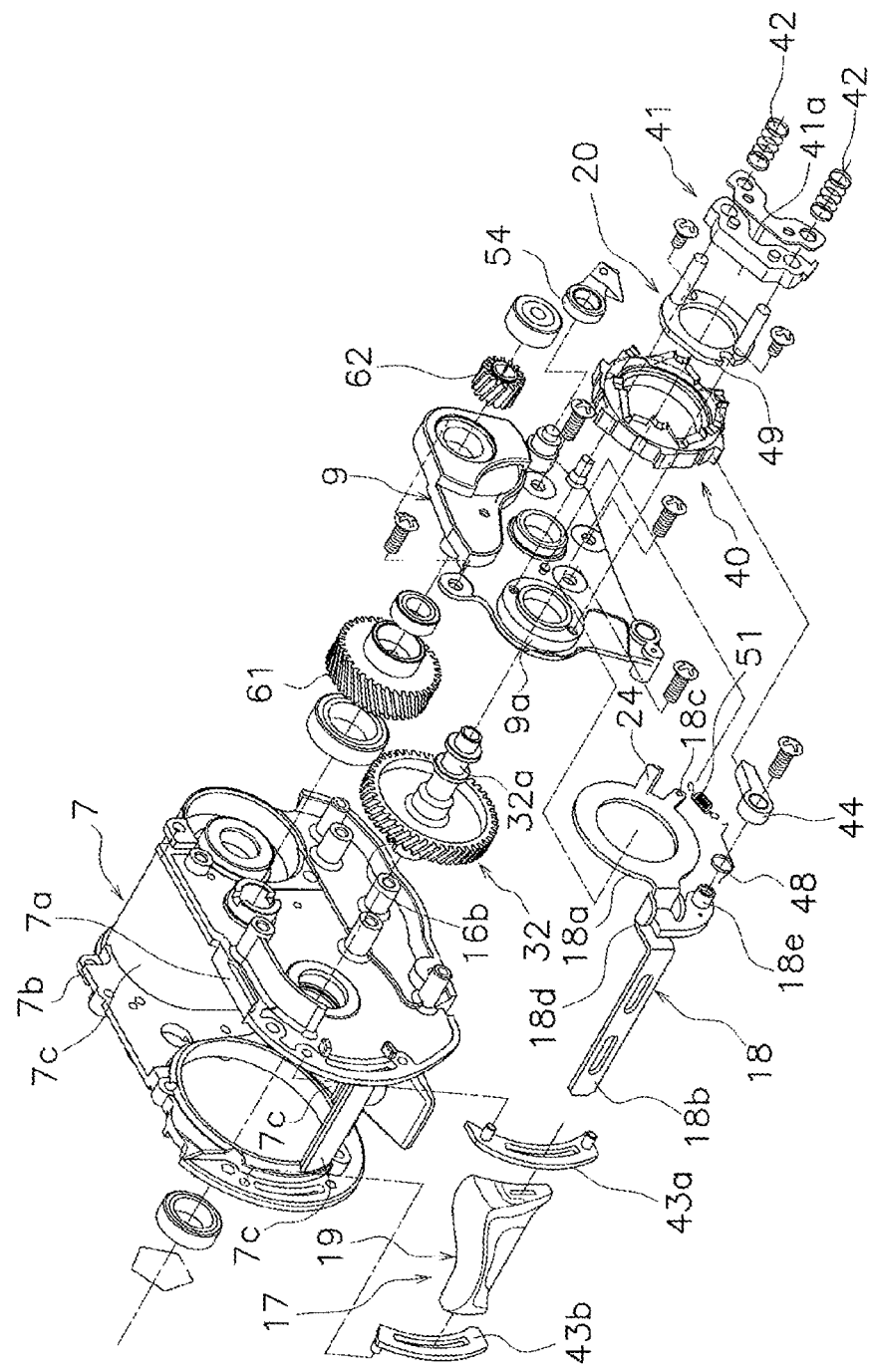
FIG. 4 is a right side view of an electric reel in a state in which a first side cover and a mechanism mounting plate are removed.
Figure 5:
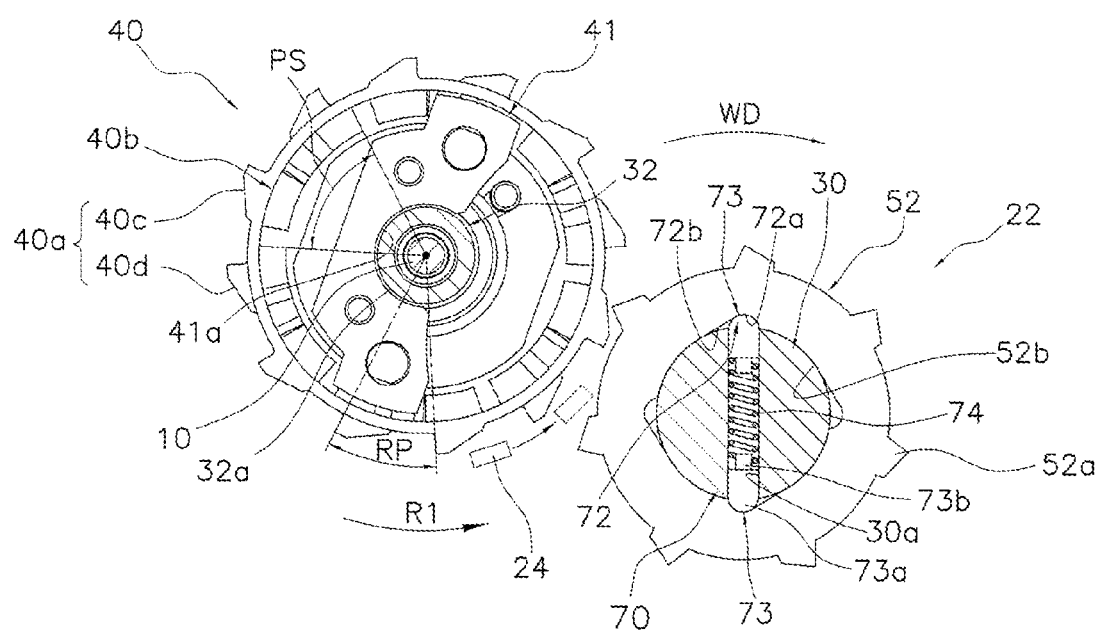
FIG. 5 is a side view of a clutch return mechanism.

The fishing reel 100 further comprises a clutch mechanism 16 (refer to FIG. 2) and a clutch operating member 17 (refer to FIG. 3). In addition, as shown in FIGS. 4 and 5, the fishing reel 100 further comprises a clutch control mechanism 20, a clutch return mechanism 22, and a regulating member 24.

The clutch mechanism 16 transmits and disengages the rotary force of the handle 4 to the spool 3. The clutch mechanism 16 is configured in the same manner as in the prior art, and is disposed between the spool shaft 10 and a pinion gear 32. As shown in FIG. 2, the clutch mechanism 16 has an engagement pin 16a and an engagement recess 16b.

When the clutch mechanism 16 is in the transmitting state, that is, when the pinion gear 32 is in the coupled position, the engagement pin 16a is engaged with the engagement recess 16b, and the rotation of the pinion gear 32 is transmitted to the spool shaft 10. When the clutch mechanism 16 is in the disengaged state, on the other hand, that is, when the pinion gear 32 is in the decoupled position, the engagement pin 16a is disengaged from the engagement recess 16b, and the rotation of the pinion gear 32 is not transmitted to the spool shaft 10.

The clutch operating member 17 is supported by the reel body 2 so as to be movable in the vertical direction at the rear portion of the reel body 2. The clutch operating member 17 can move between a first position, indicated by the solid line, and the second position, indicated by the broken line, in FIG. 3, and is biased toward the side of the first position.

As shown in FIG. 4, the clutch operating member 17 has a turning portion 18 and an operating portion 19. The turning portion 18 is supported by the reel body 2 so as to be rotatable about the axis of the spool shaft 10. The turning portion 18 has a ring part 18a, an insertion part 18b, a first spring hook part 18c, and a connecting part 18d. The ring part 18a is supported on the outer circumferential surface of a first support portion 9a disposed on the mechanism mounting plate 9 so as to be pivotable. The insertion part 18b penetrates the operating portion 19 in the axial direction and is connected to the operating portion 19 so as to be integrally movable therewith.

The first spring hook part 18c is formed to extend radially outwardly from the outer peripheral portion of the ring part 18a. One end of a first spring member 51 that biases the clutch operating member 17 toward the first position is hooked on the first spring hook part 18c. The first spring member 51 is a coil spring, for example. The other end of the first spring member 51 is hooked on an outside surface of the mechanism mounting plate 9 on the first side cover 8a side.

The connecting part 18d connects the ring part 18a and the insertion part 18b. A support shaft 18e that supports a clutch pawl 44, described further below, of the clutch control mechanism 20, is disposed on the connecting portion 18d.

The operating portion 19 is a portion for manually pressing the clutch operating member 17. The operating portion 19 is disposed essentially parallel to the spool shaft 10. The operating portion 19 can be moved along the first side plate 7a and the second side plate 7b via a first contact member 43a and a second contact member 43b.

The clutch control mechanism 20 switches the clutch mechanism 16 between the transmitting state and the disengaged state each time the clutch operating member 17 moves from the first position to the second position. The configuration of the clutch control mechanism 20 has the same configuration as in the prior art, and thus will only be described briefly.

The clutch control mechanism 20 has a clutch cam 40, the clutch yoke 41, and the clutch pawl 44.

The clutch cam 40 rotates in only one direction each time the clutch operating member 17 moves from the first position to the second position. Specifically, the clutch cam 40 rotates in a first direction R1, shown in FIG. 5, by a prescribed rotational phase RP, each time the clutch operating member 17 moves from the first position to the second position. The clutch cam 40 is mounted in the first support portion 9a of the mechanism mounting plate 9 so as to be freely rotatable.

The clutch cam 40 has a plurality of ratchet teeth 40a and a plurality of cam portions 40b. The plurality of ratchet teeth 40a are disposed in the circumferential direction of the outer circumferential surface of the clutch cam 40 with spaces therebetween. The prescribed rotational phase RP is determined by the number of the ratchet teeth 40a. In the present embodiment, there are 12 ratchet teeth 40a and the prescribed rotational phase RP is 30 degrees.

Each ratchet tooth 40a comprises a first ratchet tooth 40c and a second ratchet tooth 40d. The first ratchet tooth 40c and the second ratchet tooth 40d are disposed alternately with spaces therebetween.

The cam portion 40b is disposed in the circumferential direction with spaces therebetween with a phase PS related to the prescribed rotational phase RP. The cam portion 40b moves the clutch yoke 41 in the axial position each time the clutch operating member 17 moves from the first position to the second position.

The clutch yoke 41 moves the pinion gear 32 to the coupled position and the decoupled position. The clutch yoke 41 is supported by a guide member 49 fixed to the first support portion 9a of the mechanism mounting plate 9 shown in FIG. 4 so as to be movable in the axial direction. The clutch yoke 41 is biased toward the clutch cam 40 in the axial direction by two second spring member 42 attached to the guide member 49. The clutch yoke 41 has an engagement portion 41a that engages the annular recess 32a of the pinion gear 32.

The clutch pawl 44 is pivotally supported by the support shaft 18e of the turning portion 18. The clutch pawl 44 rotates the clutch cam 40 in the first direction R1 by the prescribed rotational phase RP as the clutch operating member 17 moves from the first position to the second position. Specifically, the clutch pawl 44 engages with either the first ratchet teeth 40c or the second ratchet teeth 40d of the ratchet teeth 40a and presses the clutch cam 40 in the first direction R1. The clutch pawl 44 is biased toward the ratchet teeth 40a by a third spring member 48 supported on the support shaft 18e of the turning portion 18.

When the clutch mechanism 16 is in the disengaged state, the clutch mechanism 16 is returned to the transmitting state via the clutch return mechanism 22 by rotation of the handle 4. The clutch return mechanism 22 includes the rotating member 52 (one example of a second rotating member). The rotating member 52 is disposed so as to be rotatable about the axis of rotation C of the drive shaft 30 on the outer peripheral side of the drive shaft 30. The rotating member 52 is supported by the drive shaft 30 and rotates in accordance with the rotation of the handle 4. The rotating member 52 in the present embodiment is made of resin.

The rotating member 52 has a plurality of projecting portions 52a and a connecting hole 52b. The projecting portions 52a are disposed at intervals in the circumferential direction. The projecting portions 52a engage the first ratchet teeth 40c of the clutch cam 40 by rotation of the handle 4 to rotate the clutch cam 40 in the first direction R1, when the clutch mechanism 16 is in the disengaged state.

The projecting portions 52a are configured so as not to engage the second ratchet teeth 40d of the clutch cam 40. Specifically, the second ratchet teeth 40d are formed such that the thickness in the radial direction is thinner than the first ratchet teeth 40c. In addition, when the clutch mechanism 16 is in the transmitting state, the projecting portions 52a are disposed in a position close to the second ratchet teeth 40d. Therefore, due to the projecting portions 52a, even if the handle 4 is rotated, the clutch cam 40 does not rotate in the first direction R1.

The connecting hole 52b is circular except for the engagement recess 72, described further below, and the drive shaft 30 penetrates axially therethrough.

The regulating member 24 regulates the operation of the clutch return mechanism 22 when the clutch mechanism 16 is switched from the transmitting state to the disengaged state by the movement of the clutch operating member 17.

Specifically, when the clutch mechanism 16 is in the transmitting state, if the clutch operating member 17 is moved from the first position to the second position, the clutch mechanism 16 is switched from the transmitting state to the disengaged state by the rotation of the clutch cam 40. The regulating member 24 regulates the operation of the clutch return mechanism 22 during at least a part of the period between the time that the clutch mechanism 16 is switched from the transmitting state to the disengaged state to the time that the clutch operating member 17 is returned to the second position. The aforementioned at least a part of the period includes the time that the clutch operating member 17 is in the second position.

As shown in FIG. 4, the regulating member 24 is disposed on the turning portion 18 of the clutch operating member 17. Specifically, the regulating member 24 extends from the ring portion 18a of the turning portion 18 in the axial direction in a plate-like form. The regulating member 24 is integral with the turning portion 18. The regulating member 24 is formed, for example, by bending a portion of the turning portion 18.

The regulating member 24 controls interference between the projecting portions 52a of the rotating member 52 and the first ratchet teeth 40c of the clutch cam 40 when the clutch mechanism 16 is switched from the transmitting state to the disengaged state by movement of the clutch operating member 17. Specifically, the regulating member 24 turns from a standby position, indicated by the solid line in FIG. 5, to a regulated position, indicated by the broken line, as a result of the turning portion 18 turning as the clutch operating member 17 moves from the first position to the second position. As a result, the rotation of the rotating member 52 in the line-winding direction WD is controlled by the regulating member 24, and the operation of the clutch return mechanism 22 due to a rotation of the handle 4 is prevented.

Figure 6:
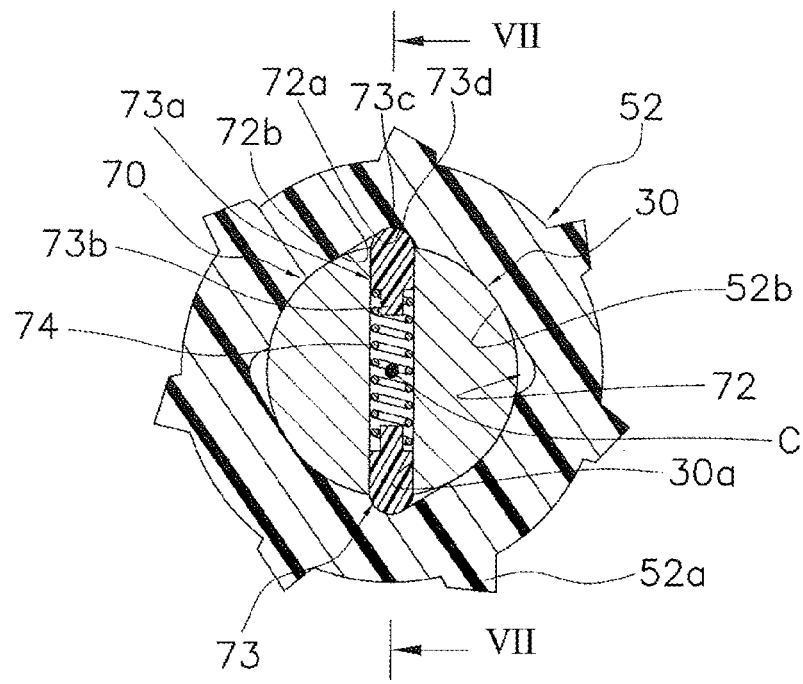
FIG. 6 is a cross-sectional view of a torque limiting device cut along a plane orthogonal to a drive shaft.
Figure 7:
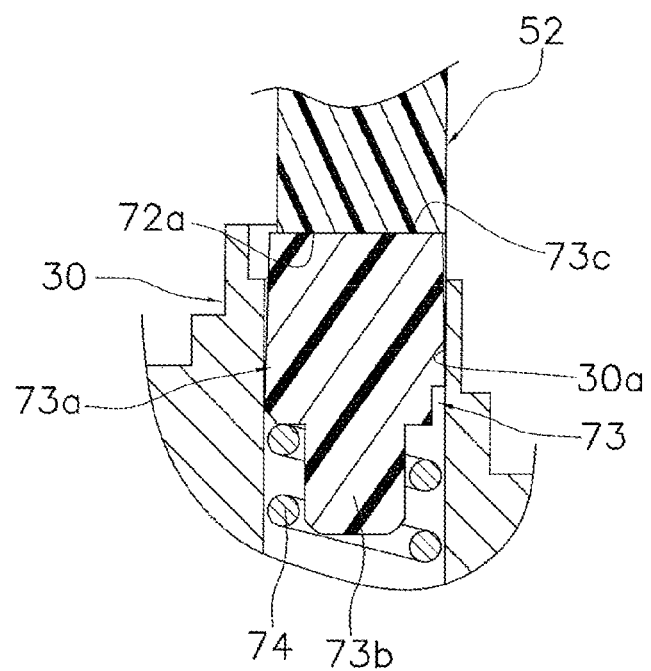
FIG. 7 is a partial cross-sectional view of the torque limiting device cut along line VII-VII in FIG. 6.
Figure 8:
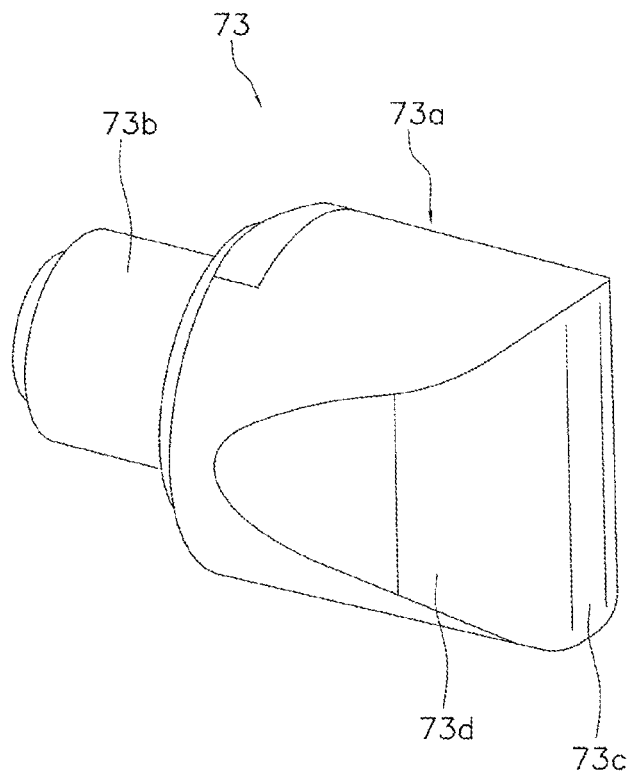
FIG. 8 is a perspective view of an engagement member.
Figure 9:
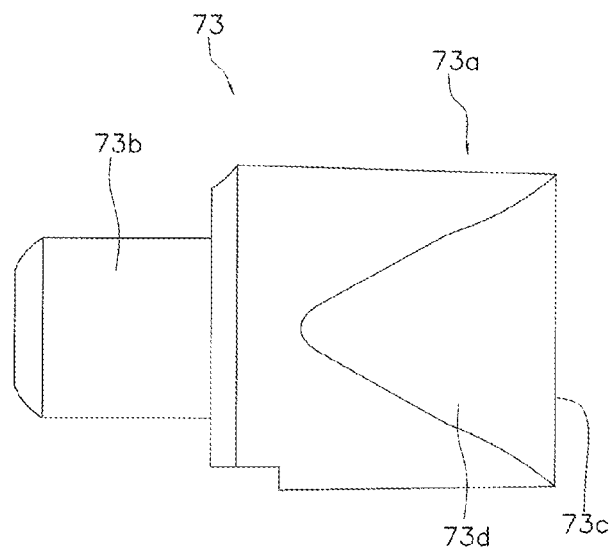
FIG. 9 is a side view of the engagement member.

As shown in FIGS. 5 and 6, the fishing reel 100 further comprises a torque limiting device 70. The torque limiting device 70 limits the torque that is transmitted between the drive shaft 30 and the rotating member 52. The torque limiting device 70 prevent damage to the regulating member 24 and the projecting portions 52a, when a large load is applied to the regulating member 24.

The torque limiting device 70 comprises engagement recesses 72 (or at least one engagement recess 72), engagement members 73 (or at least one engagement member 73), and a biasing member 74.

The engagement recesses 72 are formed on the inner circumferential surface of the rotating member 52. The engagement recesses 72 are formed on the inner circumferential surface of the rotating member 52 so as to be recessed in the radially outward direction. The engagement recesses 72 are formed in the connecting hole 52b. In the present embodiment, four engagement recesses 72 are disposed in the circumferential direction of the drive shaft 30 with spaces therebetween.

The engagement recess 72 has locking surface 72a and an inclined surface 72b. The locking surface 72a is formed along the distal ends of a pair of the engagement members 73. The locking surface 72a extends in the rotational axis direction. The inclined surface 72b is configured to bias the rotating member 52 in the line-winding direction WD. The inclined surface 72b is formed so as to be linearly inclined, as seen from the axial direction of the drive shaft 30, and so that the inner diameter thereof increases toward the line-winding direction WD.

The engagement member 73 can include a single pin member or a pair of pin members. The engagement member 73 is disposed on the drive shaft 30 so as to be able to advance toward/retreat from the rotating member 52. Specifically, the engagement member 73 is housed in a through-hole 30a that is formed penetrating the drive shaft 30 in the radial direction so as to be capable of advancing and retracting. The through-hole 30a is formed in a position overlapping the rotating member 52 in the radial direction. The movement of the engagement member 73 in the radial direction is guided by the inner circumferential surface of the through-hole 30a.

As shown in FIGS. 6 to 9, each pin member of the engagement member 73 has a head portion 73a that can engage the engagement recess 72, and a shaft portion 73b with a smaller diameter than the diameter of the head portion 73a.

At least the head portion 73a of the engagement member 73 is made of resin. In the present embodiment, the entire engagement member 73 is made of resin.

The head portion 73a has a straight part 73c and one pair of inclined portions 73d. The straight part 73c is formed at the tip of the head portion 73a. The straight part 73c has a shape that comes in contact along a line with the engagement recess 72 in the rotational axis direction. Specifically, the straight part 73c extends linearly in the rotational axis direction. Such a linear extension in the rotational axis direction includes a shape that extends linearly, slightly inclined with respect to the rotational axis direction. The straight part 73c can thus extend linearly, slightly inclined with respect to the rotational axis direction. The straight part 73c is formed over the entire length of the head portion 73a in the rotational axis direction. The straight part 73c comes in contact along a line at least with the engagement recess 72. The straight part 73c can be formed on a part of the head portion 73a in the rotational axis direction.

The pair of inclined portions 73d is connected to the straight part 73c. The pair of inclined portions 73d is formed on the side surface of the head portion 73a and extend from the straight part 73c essentially in the circumferential direction. The pair of inclined portions 73d extends in the rotational axis direction and the radial direction, and is formed so as to outwardly extend of expand in the rotational axis direction as the pair approaches the straight part 73c. At least a part of the pair of inclined portions 73d can come into contact with the engagement recess 72. In the present embodiment, a portion of the pair of inclined portions 73d adjacent to the straight part 73c comes into contact with the engagement recess 72.

When the head portion 73a presses the locking surface 72a, the rotating member 52 rotates together with the rotation of the drive shaft 30. When an unacceptable amount of torque is applied between the drive shaft 30 and the rotating member 52, the head portion 73a retreats into the through-hole 30a, and the drive shaft 30 rotates relative to the rotating member 52. That is, when a torque that exceeds an acceptable value is applied between the drive shaft 30 and the rotating member 52, only the drive shaft 30 rotates.

The biasing member 74 is housed in the through-hole 30a. The biasing member 74 biases the engagement member 73 toward the rotating member 52. The biasing member 74 is, for example, a coil spring, and is attached to the shaft portion 73b of the engagement member 73 in a compressed state.

In the torque limiting device 70 as described above, since the head portion 73a of the engagement member 73 has the straight part 73c at the distal end, the engagement member 73 comes in contact with the engagement recess 72 along a line. As a result, since stress is distributed as compared with the case in which the engagement member 73 comes in contact with the engagement recess 72 at a point, the durability of the engagement member 73 and the engagement recess 72 is improved. As a result, the durability of the torque limiting device 70 can be improved.

In addition, since the engagement member 73 and the rotating member 52 are made of resin, the weight of the torque limiting device 70 can be reduced as compared with the case in which the engagement member 73 and the rotating member 52 are made of metal.

Other Embodiments

One embodiment of the present invention is described above, but the present invention is not limited to the above-described embodiment, and various modifications can be made without departing from the scope of the invention. Specifically, the various embodiments and modified examples described in the present Specification can be combined in any manner as deemed necessary.

In the embodiment described above, an electric reel in which the spool 3 is driven by the motor 12 is disclosed as the fishing reel, but the present invention can also be applied to a manual fishing reel.

In the present embodiment, the torque limiting device 70 is configured to limit the torque that is transmitted between the drive shaft 30 and the rotating member 52, but the torque limiting device 70 can limit the torque between a worm shaft of a level winding mechanism that evenly winds the fishing line onto the spool 3, and a driven gear that is supported by the worm shaft, for example. In addition, the torque limiting device 70 can be configured to limit the torque of a rotating member that transmits rotation to a reciprocating mechanism that moves the spool of a spinning reel in reciprocating fashion. Additionally, the torque limiting device 70 can limit the torque between the drive shaft 30 and another rotating member that is supported on the drive shaft 30. For example, it can limit the torque between the drive shaft 30 and a rotating member that transmits rotation to a driven gear. In addition, it can limit the torque between the spool shaft 10 and a rotating member that is supported on the spool shaft 10.

In the embodiment described above, the engagement member 73 is composed of one pair of pin members, but the engagement member 73 can be composed of, for example, one pin member. It is sufficient if the torque limiting device 70 has at least one engagement recess 72.

In the embodiment described above, the engagement member 73 and the rotating member 52 are made of resin, and the engagement member 73 and/or the rotating member can be made of metal.

What is claimed is:

1. A torque limiting device for a fishing reel that limits torque between a first rotating member disposed so as to be rotatable relative to a reel body and a second rotating member disposed so as to be rotatable about an axis of rotation of the first rotating member on an outer peripheral side of the first rotating member, the torque limiting device comprising:
   an engagement recess disposed on an inner circumferential surface of the second rotating member;
   an engagement member having a head portion configured to engage the engagement recess and that is disposed on the first rotating member so as to be capable of advancing toward or retreating from the second rotating member; and
   a biasing member configured to bias the engagement member toward the second rotating member,
   the head portion of the engagement member having a straight part at a distal end that extends parallel to a direction of the axis of rotation of the first rotating member.

2. The torque limiting device for a fishing reel according to claim 1, wherein
   at least the head portion of the engagement member is made of resin.

3. A fishing reel, comprising:
   the reel body;
   the first rotating member disposed so as to be rotatable relative to the reel body;
   the second rotating member disposed so as to be rotatable about the axis of rotation of the first rotating member on the outer peripheral side of the first rotating member; and
   the torque limiting device according to claim 1 configured to limit torque between the first rotating member and the second rotating member.

4. A torque limiting device for a fishing reel that limits torque between a first rotating member disposed so as to be rotatable relative to a reel body and a second rotating member disposed so as to be rotatable about an axis of rotation of the first rotating member on an outer peripheral side of the first rotating member, the torque limiting device comprising:
   an engagement recess disposed on an inner circumferential surface of the second rotating member;
   an engagement member having a head portion configured to engage the engagement recess and that is disposed on the first rotating member so as to be capable of advancing toward or retreating from the second rotating member; and
   a biasing member configured to bias the engagement member toward the second rotating member,
   the head portion of the engagement member having a straight part at a distal end that extends linearly in a direction of the axis of rotation of the first rotating member,
   the head portion connected to the straight part, and at least a portion thereof having a pair of inclined portions configured to contact the engagement recess, and
   the pair of inclined portions extending outwardly in the direction of the axis of rotation of the first rotating member as the pair approaches the straight part.

* * * * *